Nov. 1, 1960  J. DONNER  2,958,213

TORSION ELASTIC COUPLING

Filed Sept. 16, 1959

INVENTOR.
Josef Donner
BY
Patent Agent.

United States Patent Office 2,958,213
Patented Nov. 1, 1960

2,958,213

TORSION ELASTIC COUPLING

Josef Donner, Dusseldorf, Germany, assignor to Kauermann Kommanditgesellschaft, Dusseldorf, Germany Filed Sept. 16, 1959, Ser. No. 840,332

Claims priority, application Great Britain Oct. 7, 1958

8 Claims. (Cl. 64—11)

The present invention relates to a torsion elastic coupling, which comprises two sections separated from each other by a cylindrical slot coaxial to the coupling axis and which also comprises an outer coupling member and an inner coupling member each of which is provided with portions of cylindrical bores parallel to the axis of said coupling. In connection with couplings of the above mentioned type, it is known to arrange springs in said bores, said springs being arranged axially one behind the other.

The heretofore known couplings of the above mentioned type have a torsion elasticity and flexibility which are insufficient in many instances. Another drawback of the said heretofore known couplings of the type involved consists in that the springs require lubrication.

It is, therefore, an object of the present invention to provide a torsion elastic coupling of the above mentioned general type, which will overcome the drawbacks outlined above.

It is another object of this invention to provide a torsion elastic coupling of the type set forth in the preceding paragraph, which will increase the torsion elasticity and the flexibility of the coupling.

It is a still further object of this invention to provide a torsion elastic coupling of the type mentioned above, which will not require lubricating the springs.

These and other objects and advantages of the invention will appear more clearly from the following specification in connection with the accompanying drawings, in which.

*General arrangement*

As stated above, the present invention concerns a torsion elastic coupling comprising two sections separated from each other by a cylindrical slot coaxial to the coupling axis and which also comprises an outer coupling member and an inner coupling member each of which is provided with portions of cylindrical bores parallel to the axis of said coupling while springs are mounted in said bores and arranged one behind the other in axial direction of the coupling. The coupling of the present invention is characterized in that the springs, which are designed as laminar springs and have a width less than the diameter thereof, are embedded in and vulcanized to rubber. In order to increase the flexibility of the laminar spring assembly or packet, the individual spring laminae may be spaced apart and the thus created intervening gaps may be filled with rubber. In conformity with a further development of the invention, a tube may be provided within the set or packet of laminar springs whereby the torsion elasticity of the coupling may be varied. If desired, the packet of laminar springs may also be externally surrounded by tubular shells for purposes of increasing the axial displaceability of the laminar packets within said coupling.

The cross section of the individual laminar springs is quite optional and may for instance be square or of trapezoidal shape.

*Structural arrangement*

Figure 1:
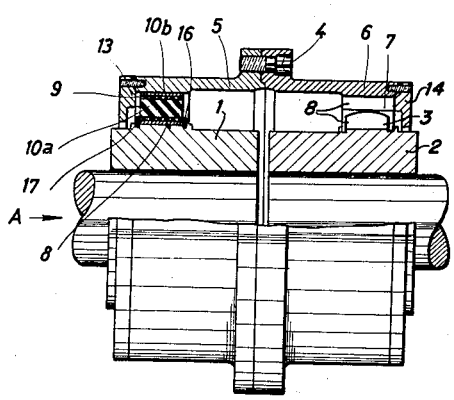
Fig. 1 represents a coupling according to the invention, partly in side view and partly in section.
Figure 2:
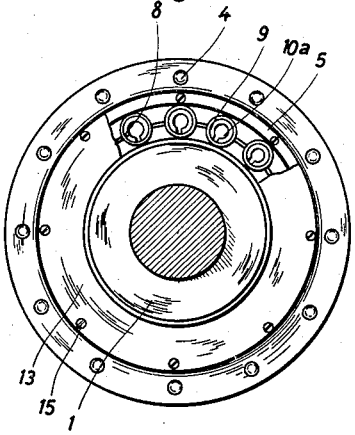
Fig. 2 is an end view of the coupling as seen in the direction of the arrow A of Fig. 1.

Referring now to the drawings in detail, the coupling shown in Figs. 1 and 2 comprises two hubs 1 and 2 to be mounted on the shaft sections, for instance the shaft sections a and b, to be coupled to each other. The end portions of hubs 1 and 2 are provided with elevations 3 each having a spherical peripheral surface which are so designed that the respective centers of said peripheral spherical surfaces are located substantially on the axis of rotation of said hubs. While these hubs form an inner portion of the coupling, the coupling further comprises outer portions in the form of sleeves 5 and 6 surrounding said inner portions and serving for transmission of power. The said two sleeves 5 and 6 are fixedly connected to each other by bolts 4 and have their end portions provided with internally projecting collars 7 with a cylindrical bore. In this way, when said shafts occupy an inclined position with regard to each other, the sleeves 5 and 6 will be able to slide on the respective spherical surfaces of the elevations 3 of hubs 1 and 2.

Figure 6:
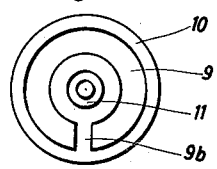
Fig. 6 is an end view of the spring assembly of Fig. 5.

The elevations 3 of the hubs and the collars 7 of the sleeves 5 and 6 are provided with bores 8 portions of which are located in the hubs 1 and 2 while supplementing portions of said bores are located in sleeves 5 and 6, i.e. the collars 7 thereof. The said bores 8 serve for receiving the laminar spring sets or packets. According to Figs. 1 and 2, the said elastic laminar spring sets or packets are formed by slotted spring laminae 9 as shown for instance on a larger scale in Fig. 6, said spring laminae 9 being arranged adjacent to each other. These spring laminae are provided with a slot 9b in order to provide an adequate degree of elasticity.

According to the invention, the laminae springs 9 are vulcanized into rubber. If, as shown in Fig. 1, the laminae springs 9 are in close abutting contact with each other, the interior of the spring laminae will enclose a cylindrical mass of rubber 10a, while a rubber ring 10b will surround said laminar springs. The thus obtained shock and oscillation cushioning effect of the spring sets will be greatly superior to that of spring sets without said rubber layers. Furthermore, the just described arrangement of the invention eliminates the need of specially lubricating the springs. Moreover, the outer rubber ring 10b greatly improves the distribution of the load on the springs.

Figure 3:
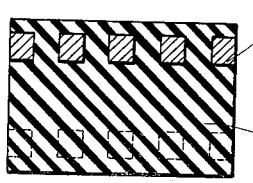
Figs. 3 to 5 illustrate longitudinal sections through different assemblies of laminar springs.
Figure 4:
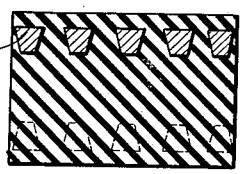

Fig. 3 illustrates on an enlarged scale a construction in which the individual spring laminae 9 are vulcanized in spaced relationship to each other into a rubber block 10 whereby the flexibility of the spring set will be greatly increased. The cross section of these laminar springs may, for instance be a square. Of course, also other cross sectional shapes are possible. Thus, according to Fig. 4, the laminar springs 9a have a trapezoidal cross section.

Figure 5:
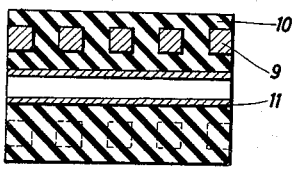

According to the modification shown in Fig. 5, a tube 11 is arranged in the interior of the spring set, whereas according to Fig. 9 the individual spring laminae 9 are provided with a slot 9b.

Figure 7:
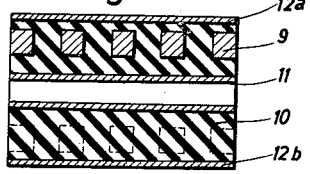
Fig. 7 is a further longitudinal section through a modified spring assembly of the invention.
Figure 8:
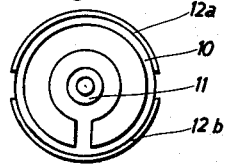
Fig. 8 is an end view of the spring assembly of Fig. 7.

According to the embodiment shown in Figs. 7 and 8, the rubber block 10 in addition to being provided with the inner tube 11 is also surrounded by two tubular shells 12a and 12b. This arrangement improves the axial displaceability of the laminar spring assemblies within the bore 8 of the coupling. If desired, the said tubular shells 12a and 12b may be split in longitudinal direction thereof. The complete elastic bodies thus created may be inserted into the bores 8 of the coupling with a suitable amount of pre-compression and may also be vulcanized thereto.

For purposes of covering the inside members of the torsion elastic coupling according to the invention, annular cover plates 13 and 14 are respectively secured by screws 15 to the open ends of the sleeves 5 and 6. The laminar spring sets may be held in their respective positions by circlips or spring rings 16 and 17.

It is, of course, to be understood that the present invention is, by no means, limited to the particular constructions shown in the drawings but also comprises any modifications within the scope of the appended claims.

It is also to be understood that the term "rubber" or "rubber material" as appearing herein covers natural rubber as well as synthetic rubber and similar rubber-like material.

What I claim is:

1. A torsion elastic coupling which comprises: two coupling sections facing each other along an end surface thereof and arranged for respectively receiving two shafts to be coupled to each other, each of said sections comprising an outer member and an inner member, connecting means interconnecting said outer members to each other, said inner members being slightly spaced from each other by a gap the plane of which is substantially perpendicular to the axis of rotation of said coupling, said inner and outer members of each of said coupling sections being provided with complementary recesses forming together with each other cylindrical bores with the axes thereof at least nearly parallel to the axis of rotation of said coupling, and a plurality of sets of laminar springs respectively arranged in said bores and vulcanized into rubber material, the individual laminar springs of each of said sets being spaced from each other by rubber material therebetween.

2. A torsion elastic coupling which comprises: two coupling sections facing each other along an end surface thereof and arranged for respectively receiving two shafts to be coupled to each other, each of said sections comprising an outer member and an inner member, connecting means interconnecting said outer members to each other, said inner members being slightly spaced from each other by a gap the plane of which is substantially perpendicular to the axis of rotation of said coupling, said inner and outer members of each of said coupling sections being provided with complementary recesses forming together with each other cylindrical bores with the axes thereof at least nearly parallel to the axis of rotation of said coupling, and a plurality of sets of laminar springs respectively arranged in said bores and vulcanized into rubber material, each of said spring sets including a tubular member located within the central portion of and extending through individual laminar springs of the respective spring set.

3. A torsion elastic coupling which comprises: two coupling sections facing each other along an end surface thereof and arranged for respectively receiving two shafts to be coupled to each other, each of said sections comprising an outer member and an inner member, connecting means interconnecting said outer members to each other, said inner members being slightly spaced from each other by a gap the plane of which is substantially perpendicular to the axis of rotation of said coupling, said inner and outer members of each of said coupling sections being provided with complementary recesses forming together with each other cylindrical bores with the axes thereof at least nearly parallel to the axis of rotation of said coupling, and a plurality of sets of laminar springs respectively arranged in said bores and vulcanized into rubber material, each of said spring sets comprising tubular shells on the outside thereof.

4. A coupling according to claim 3, in which said tubular shells are split in longitudinal direction thereof.

5. A coupling according to claim 1, in which the individual laminar springs have a square cross section.

6. A coupling according to claim 1, in which the individual laminar springs have a trapezoidal cross section.

7. A torsion elastic coupling which comprises: two coupling sections facing each other along an end surface thereof and arranged for respectively receiving two shafts to be coupled to each other, each of said sections comprising an outer member and an inner member, connecting means interconnecting said outer members to each other, said inner members being slightly spaced from each other by a gap the plane of which is substantially perpendicular to the axis of rotation of said coupling, said inner and outer members of each of said coupling sections being provided with complementary recesses forming together with each other cylindrical bores with the axes thereof at least nearly parallel to the axis of rotation of said coupling, and a plurality of sets of laminar springs respectively arranged in said bores and vulcanized into rubber material, the individual laminar springs of each set being spaced from each other by rubber material therebetween, said sets of laminar springs vulcanized in rubber material being slightly larger in diameter in the unconfined state than said bores whereby to be in a state of precompression when mounted in said bores.

8. A torsion elastic coupling which comprises: two coupling sections facing each other along an end surface thereof and arranged for respectively receiving two shafts to be coupled to each other, each of said sections comprising an outer member and an inner member, connecting means interconnecting said outer members to each other, said inner members being slightly spaced from each other by a gap the plane of which is substantially perpendicular to the axis of rotation of said coupling, said inner and outer members of each coupling section being provided with complementary recesses forming together with each other cylindrical bores with the axes thereof at least nearly parallel to the axis of rotation of said coupling, and a plurality of sets of laminar springs respectively arranged in said bores, said laminar springs being in spaced parallel relation, and rubber material completely enclosing said laminar springs and filling the spaces therebetween and vulcanized to the laminar springs.

References Cited in the file of this patent

UNITED STATES PATENTS

| | | |
|---|---|---|
| 2,840,999 | Donner et al. | July 1, 1958 |
| 2,858,682 | Fawick | Nov. 4, 1958 |

FOREIGN PATENTS

Grabmann et al.: German application Ser. No. 1,037,213, published August 21, 1958.